United States Patent [19]

Savio

[11] 3,809,213
[45] May 7, 1974

[54] DEVICE FOR WITHDRAWING AND POSITIONING COPS AND BOBBINS IN BULK

[75] Inventor: Luciano Savio, Pordenone, Italy

[73] Assignee: Officine Savio S.p.A., Pordenone, Italy

[22] Filed: Apr. 26, 1972

[21] Appl. No.: 247,834

[30] Foreign Application Priority Data
Apr. 4, 1971 Italy................................ 83338/71

[52] U.S. Cl............................................. 198/33 AA
[51] Int. Cl............................................. B65g 47/24
[58] Field of Search.......... 198/29, 33 AA; 221/156, 221/163

[56] References Cited
UNITED STATES PATENTS
3,420,354   1/1969   Gardiner...................... 198/33 AA
3,682,293   8/1972   Kamp............................ 198/33 AA FOREIGN PATENTS OR APPLICATIONS
1,452,872   8/1966   France........................... 198/33 AA Primary Examiner—Edward A. Sroka
Attorney, Agent, or Firm—Stevens, Davis, Miller & Mosher

[57] ABSTRACT

Conveyor means for withdrawing cops or bobbins stored in bulk in a storage container formed with an outlet ramp. The conveyor means including lower belt sections spaced and proportioned with respect to each other so as to pre-position and maintain the cops or bobbins with their axes side-by-side in parallel alignment, and wherein the final section of the lower belt sections is provided with air jet means to erect loose yarn ends and with means to cut said loose yarn ends prior to final removal for use in automatic spooling machines or the like.

7 Claims, 5 Drawing Figures

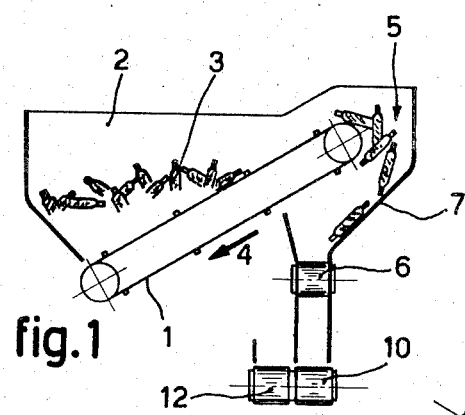
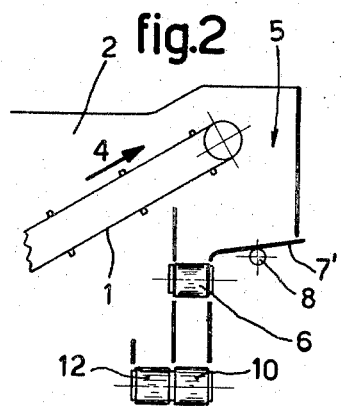
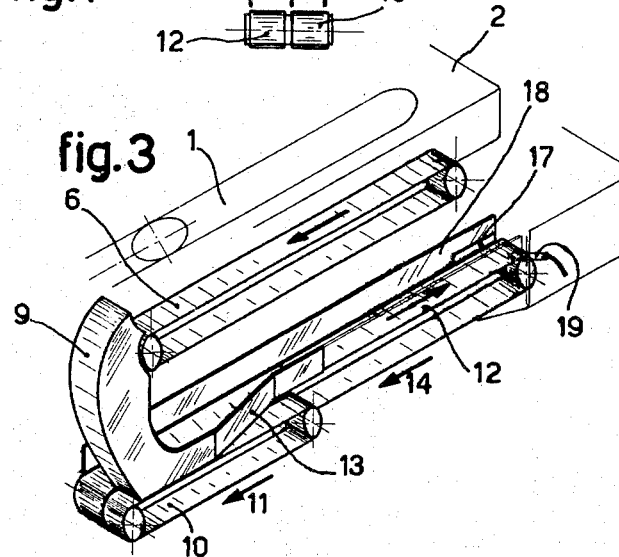
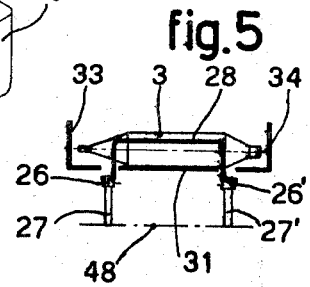
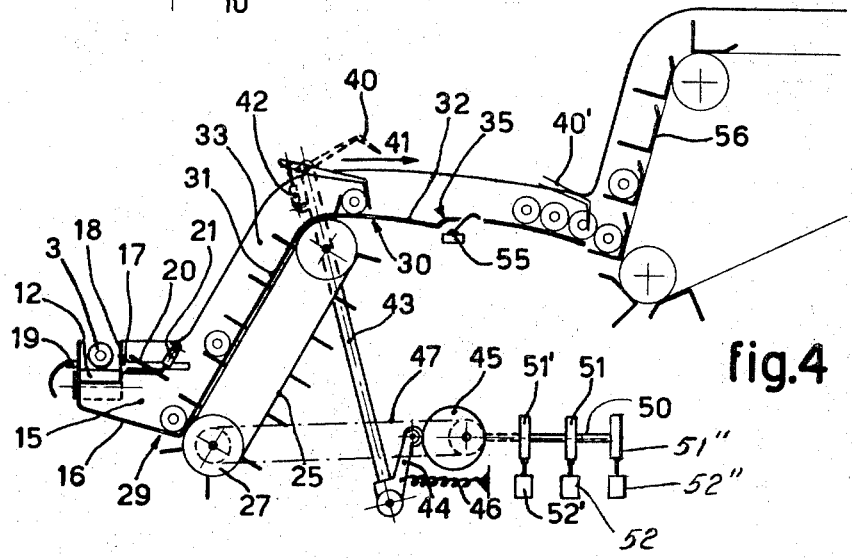

DEVICE FOR WITHDRAWING AND POSITIONING COPS AND BOBBINS IN BULK

The present invention concerns a procedure suitable for withdrawing cops or bobbins in bulk and for positioning them, properly aligned with their axes parallel, ready to be withdrawn by usage means, said means possibly being orientation means, means suited to picking up the end of the yarn etc., and also concerns a device suitable for carrying out said procedure.

More specifically, the subject of the invention, the device for withdrawing and positioning cops and/or bobbins, is used for withdrawing cops or bobbins in bulk from a container and for positioning them, after having disposed them axially, in a storage area in which they remain properly aligned and axially parallel, ready to be withdrawn by conveyor means, for example compartmented conveyors.

Hereafter we shall use the term "cops" exclusively but it is to be understood that the invention could also be used for bobbins. We are using its application to cops so as to simplify the description.

The compartmented conveyor means, as we have said, could be part of a machine suitable for picking up the ends of yarn on cops and then positioning said cops in suitable moving storage areas which, for example, supply an automatic spooling machine.

The machine or apparatus, of which the withdrawing compartmented conveyor forms part, is, however, not a concern of the present invention since the former is suited for operating downstream from the operations concerned with the means which are our subject; the former, therefore, could be any type of machine which has to withdraw from a storage area cops which have already been aligned, even if not orientated in a given direction in respect of that art of themselves which is below the wound yarn.

There are two main problems involved in feeding the aforesaid storage area in an independent and automatic way, namely:- to withdraw the cops from a container into which they are thrown in bulk, and to position them at a sufficiently rapid rate in the said storage area so as to be able to meet the requirements of the machine downstream, wherein said requirements might need the arrival of a cop every 2 to 2.5 seconds.

Throwing in the cops or bobbins in bulk simplifies storage and conveyor operations upstream from the invention as well as the loading of the storage space of the same and also increases the number of machines which can be tended by one single operator.

The timing of a cop every 2 to 2.5 seconds is necessary so as to be able to meet the requirements of the eventual machine which is to use the cops thus prepositioned.

To meet these requirements the invention uses a series of conveyor bands which, in conjunction with a storage device, succeed in bringing about a stock of cops suitable for the purpose.

In greater detail, a withdrawal means withdraws the cops in bulk from a container and then makes them drop onto a discharge belting which continuously clears the dropping zone and aligns the cops. The withdrawal means can be, in our example, also composed of a belting which forms the bottom or a part of the bottom of the storage area for cops or bobbins in bulk.

From the discharge belting the cops are transferred to another belting which is able to move at a speed higher than that of the former so as to space out the cops. Between the spacer belting and the discharge belting we can have an intermediate belting which serves to withdraw the cops and distribute them on the spacer belting; this intermediate belting becomes necessary when, so as to economize in sapce, we arrange the beltings temporarily above each other or side by side or indeed not in line one after the other. Where beltings are placed in sequence one after the other, the discharge belting and the spacer belting could be all one or, in the case of conveyors produced with beltings consisting of various components or with linked tracks, the components of the beltings could be spaced in such a way as to create a continuous band.

The cops which come onto the spacer belting, because of the action of possible devices to control their entry, follow each other axially and in this reciprocal position drop into an intermediate storage area and, owing to the shape of this latter, tend to move laterally. As we have said, the beltings can be formed either in a complete, unbroken surface or with rollers or with a sequence of various components or of tracks, and are placed side by side and more or less spaced out, one from the other.

The intermediate storage area is served by a conveyor with hooks, which withdraws one, two or more cops each time, one after the other, it not being possible for them to lie two in line. The conveyor with hooks places the cops on an inclined plane, from which a storage device moves them and positions them in a final storage area whence the aforesaid compartmented conveyor withdraws one cop at a time (or one bobbin at a time).

It is clear that instead of the compartmented conveyor there could be some other apparatus such as a pusher device or some other similar thing, for example.

The conveyor with hooks is necessary when the cops have to be lifted so as to bring them to the same level as the compartmented conveyor or other withdrawal apparatus.

The same can be said of the storage device which mostly serves to keep the cops pressed together in such a way that they have to enter every empty compartment, or indeed to prevent empty spaces being left.

In place of this storage device there could be provided a sliding plane with an accentuated slope; however, in this way there is the danger that the cops might be arranged askew on the sloped plane.

Therefore the invention withdraws by means of a loader the cops from a container where they are lying in bulk, discharges them in bulk on a conveyor, which aligns them and then moves them onto a spacer-belt, which spaces them out and disposes them axially, possibly with the help of an intermediate belting; said spacer-belt spaces out the cops and positions them axially, cop by cop (or bobbin by bobbin) so that each one follows after the one before.

This spacer-belt conveys them to a storage area, where they lie with their axes parallel and also perhaps stacked up whenever it is necessary to provide a lifting conveyor with hooks for the technical requirements of the usage point.

So as to improve the perforamnce of the invention, improvements to it could be provided, so that, for example, it may function until the final storage area contains a certain number of cops; it may have some suction means which suck in any thread-end remaining, cut it off and thus clean up the cop; finally, the cops discharged in bulk onto the discharge belting may first have to pass over a vibrating surface which disposes them in a reciprocally parallel position.

With reference to the aforesaid, we have shown in the attached table a preferred layout for a withdrawal-and-positioning device wherein, in our example, the belts are overlapped; while the point of use of the compartmented conveyor is a little raised and therefore requires the intermediate conveyor with hooks. The belts used in our example are full continuous belts, but belts made in strips or with rollers could be used in their place.

Referring again to our example, we used a conveyor belt as a withdrawal means, but its place could be taken by a constant-pressure arm to move the top layer of the cops or by a radial extractor device or else by a spider-legged grab.

The preferred layout shown is not binding nor limitative as regards the reciprocal position of the components or as regards the consequent simplifications which could be derived therefrom; said layout is shown here to simplify the invention in its entirety precisely by using a preferred layout, since what has been planned in the description, in addition to the variants indicated hereafter, is sound.

FIG. 1 shows a container for cops in bulk which has its withdrawal means consisting, in our example, of a conveyor wiht protrusions; the conveyor is placed below the container and unloads onto a discharge belting with an unbroken surface.

FIG. 2 shows a variant from FIG. 1 wherein before dropping onto the discharge belting the cops drop onto a vibrating plane which predisposes them, reciprocally aligned to each other.

FIG. 3 shows the discharge belting, with an intermediate belting below it and positioned alongside the spacer-belting.

FIG. 4 shows the intermediate storage area, fed by the spacer-belting, with the conveyor with hooks, the storage device and the final storage area, from which a compartmented conveyor withdraws cops in our example; in the final storage area we have foreseen a device for limiting the number of cops.

FIG. 5 shows a preferred type of conveyor with hooks which can be used for our purpose.

Referring to the above description and to the figures which show the preferred layout that we have adopted in our example, we have the following: the conveyor with protrusions 1 acts at the bottom of the container 2 wherein the cops 3 lie in bulk. By moving in the direction 4 the conveyor 1 transfers the cops one by one or in groups into the space 5 from which they drop onto the discharge belting 6 after having fallen onto the plane 7.

The plane 7 (see FIG. 2) can be made more horizontal and be made to vibrate by means of the vibrating device 8.

From the discharge belting 6, the cops 3, in our example, drop into the conveyor 9, which keeps them axially aligned and prevents them from being positioned askew.

In our example the conveyor 9 places the cops on the intermediate belting 10 which moves in the direction 11.

The cops on the belting 10 are then turned aside onto the belting 12 by a surface 13.

If the discharge and spacer beltings followed one after the other and were, as far as possible, only one single belting, this surface 13 would still be present and would possibly be assisted by an upper device to limit passage.

Owing to the position of the surface 13 and to the presence of a possible vertical limiting device, the belting 12 is not able to carry more than one cop transversely across its width.

The speed of the belting 12, which rotates in the direction 14, can be even 1.5 to 2 times higher than that of the belting 12, and this fact allows better axial spacing-out of the cops on the belting 12. Their small sidewalls keep the cops on the beltings.

From the belting 12 the cops fall into the intermediate storage area 15 which has its bottom 16 sloped so as to force the cops to move laterally and possibly to stack themselves on each other.

In our example when the cops pass the end of the belting 12, a suction effect is applied to them from a mouth 17 that, in our example, is positioned in the sidewall 18.

This suction effect can be accentuated by the presence of an air jet emitted from the nozzle 19. The suction effect draws from the cops 3 any loose threads or any yarn-end which has become detached; said yarn-end is then cut by the shears 20, which work continuously and are positioned just downstream from the mouth 17 and at the side of the intermediate storage-space 15.

The shears 20 can be activated continuously by a pneumatic system 21, which can consist, in our example, of a small piston.

The cops fall to the bottom of the intermediate storage area and, being free of loose threads or of any yarn-end which was too long and became unwound, are picked up at a rate of one or more by the conveyor with hooks 25, which is composed of two chains 26 and 26' that rotate between two toothed wheels 27 and 27' and are connected by a bridge 28.

The cops which are thus picked up always follow one after the other and are never end to end, the bridge passes through the openings 29 and 30 and thus allows of the presence a sliding surface 31 which connects the bottom 16 to the inclined plane 32. Therefore, the bridge 28, in our example, picks up the cop 3 and, making it slide over the surface 31, deposits it on the inclined plane 32, at which point the bridge disappears through the opening 30.

The cops are kept in position by the sidewalls 33 and 34, of which one or both can be adjusted so as to adapt them to the various lengths of the bobbins.

When the cops have been unloaded onto the inclined plane 32 they halt, in our example, behind the raised portion 35, which is separated from the opening 30 by a distance at least as great as the maximum diameter of a cop and, in any case, not less than the total maximum diameters of as many cops as can be placed between one bridge 28 and the next.

In the step with the bridges 28 a storage means 40 acts, in the direction 41, on the cops halted behind the raised portion 35 and moves them into the final storage-area where they arrive, properly aligned and with their axes parallel.

In our example the storage means 40 is raised to allow the bridge 28 to pass and drops soon after the latter has passed owing to the effect of the means 42, which in our example consists of a small piston. As it drops, the means 40 begins to move in the direction 41.

In accordance with the preferred layout, means 40 moves in the direction of movement 41, effected by the arm 43 which feels the decreasing thrust of the cam 45 through the control lever 44. This contact lever 44 presses against the cam 45 owing to the effect of the spring 46 unless means 40 is otherwise stopped from moving in the direction of movement 41 by coming into contact with a row of cops.

If there is no cop, the decreasing length of the cam brings the means 40 up to the position 40'. If there are cops, the lever 44 follows the cam until the means 40 presses against the row of cops, after which the means 40 disengages from the cam 45 until the cam passes its dead center and again contacts lever 44 to move it and thus means 40 in the opposite direction.

The cam 45 is connected through the transmission belt 47 with the axle 48 of the pulleys 27 and 27' and thus rotates in step with them. On the axle 50 of the cam 45, said axle being shown at 90° in the Figure so as to simplify the Figure, there are two or more auxiliary cams 51, 51', 51'' in our example, which interlock with two or more micro-switches 52, 52', 52''.

One of the said cams 51, 51', 51'' serves to activate the means 42 which is linked to the means 40. The second of said cams 51, 51', 51'' serves to activate continuously the means 21; and yet another of said cams 51, 51', 51'' serves to cut out the means 55 which counts the cops as they pass by it.

This counting device serves to stop the whole apparatus when the cops 3 reach its position. It is applied when the compartmented conveyor 56 does not function continuously or has no requirement for a uniform pick-up.

In our example, the compartmented conveyor 56 passes through the middle of the plane 32 and picks up one cop per compartment.

As can be seen the invention is extremely simple and secure in its effect even in the case of its possible variations.

It is claimed:

1. A device suitable for the alignment of the cops and withdrawal of the bobbins in bulk from a container comprising a vertical container mounting a belt conveyor on the bottom thereof movable in an inclined upwardly direction, said belt conveyor being equipped with periodic protrusions extending outwardly therefrom, an inclined sliding surface positioned beyond and below the discharge end of said conveyor, endless discharge belting positioned under the edge of the discharge zone of the belt conveyor and adjacent to said surface to receive cops from said belt conveyor and surface, a copshunter positioned below said discharge belting which receives cops from said discharge belting, axially aligns said cops and feeds said cops to an endless alignment belting with a higher speed than that of the discharge belting, and a container for collecting the cops positioned at the discharge end of said alignment belting.

2. The device alignment belting of claim 1, including a vibrating surface for breaking up the piles of cops.

3. The device alignment belting of claim 1, wherein said cop shunter comprises a vertical walled transporter downstream from the discharge belting and intermediate belting, said intermediate belting and the alignment belting being side by side.

4. The device alignment belting of claim 1, including an air jet in an outlet of the alignment belting, which sweeps the upper surface of the belting, and a suction rod placed on the other side of the alignment belting in respect to the air jet.

5. The device of claim 1 in which the container is for the withdrawal and positioning of cops and bobbins, particularly suitable for automatic machines and comprises a primary store with an inclined base with cops aligned in a side by side and one upon another relation, an inclined conveyor with hooks positioned in proximity with the lowest part of the primary store to receive cops from the primary store, a limited transit store positioned at the discharge end of said inclined conveyor receiving cops from the inclined conveyor said cops being halted at the end of said transit store by a projection, a loading store extending from the end of the limited transit store, including a compartmented conveyor on which the cops are aligned side by side, a microcontact means positioned in proximity with the loading store and the halt projection to count cops and a pivotable toothed means oscillatible from the discharge end of the inclined conveyor to the compartmented conveyor to push the cops from the transit store to the loading store.

6. The device of claim 5, in which the hooks of the inclined conveyor are inclined to an upside down "U" and this "U" hook passes through a slit in the primary store and constitutes the edge of the primary store next to the hook conveyor, said transit store having a slit therein through which the "U" hook passes constituting the border of the transit store next to the hook transporter.

7. The device of claim 5, wherein said toothed means are mounted and hinged on an elastically oscillating arm pressed against a cam, said toothed means in the return phase being in proximity with the hooked conveyor said cam function depending on said microcontact means placed in proximity to the loading store, said transit and loading stores being essentially curved according to a circle with the axis in the rotational center of the oscillating arm.

* * * * *